(12) United States Patent
Brown

(10) Patent No.: US 6,698,334 B2
(45) Date of Patent: Mar. 2, 2004

(54) CHAFER

(75) Inventor: Charles A. Brown, Dallas, PA (US)

(73) Assignee: Legion Industries, Inc., Dallas, PA (US)

(*) Notice: Subject to any disclaimer, the term of this patent is extended or adjusted under 35 U.S.C. 154(b) by 82 days.

(21) Appl. No.: 10/051,473

(22) Filed: Jan. 18, 2002

(65) Prior Publication Data

US 2003/0136272 A1 Jul. 24, 2003

(51) Int. Cl.[7] .................................................. A47J 37/00
(52) U.S. Cl. ............................ 99/339; 99/483; 99/449; 99/410; 220/832; 220/827
(58) Field of Search ........................ 99/483, 339, 340, 99/403, 407, 470, 484, 448, 449; 220/843, 827, 810, 831, 832, 845

(56) References Cited

U.S. PATENT DOCUMENTS

| | | | |
|---|---|---|---|
| 2,315,089 A | * | 3/1943 | Dohrmann ................. 220/201 |
| 4,320,849 A | | 3/1982 | Yellin |
| D365,724 S | | 1/1996 | Yu |
| D369,506 S | | 5/1996 | Tinius |
| D369,507 S | | 5/1996 | Tinius |
| 5,597,500 A | | 1/1997 | Hasenfratz et al. |
| 5,788,196 A | | 8/1998 | Forman |
| 6,311,866 B1 | * | 11/2001 | Sambonet et al. ...... 220/827 X |
| 2002/0073984 A1 | * | 6/2002 | Ahn .......................... 220/810 |

* cited by examiner

Primary Examiner—Reginald L. Alexander
(74) Attorney, Agent, or Firm—Caesar, Rivise, Bernstein, Cohen & Pokotilow, Ltd.

(57) ABSTRACT

A chafer comprising a support frame, a food service pan, a cover, a cover pivoting assembly, a cover mounting assembly and a cover damper assembly. The cover has a peripheral edge and is pivotably mounted on the support frame by the cover pivoting assembly. The support frame supports the pan under the cover. The cover mounting assembly releasably mounts the cover to the cover pivoting assembly to enable the cover to be pivoted about a horizontal axis from a fully closed position to an intermediate, partially open position and to a fully open position, and vice versa. The cover is arranged to be automatically held in the fully closed, partially open or fully open positions by the mere movement of the cover to any of those positions.

24 Claims, 9 Drawing Sheets

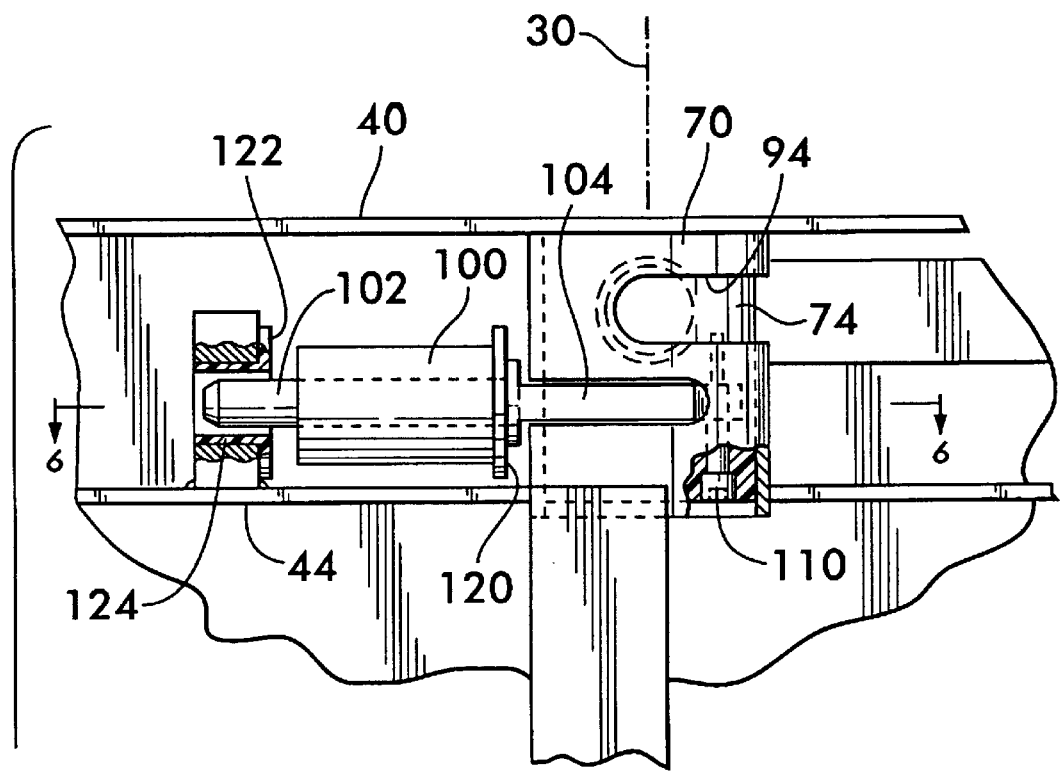
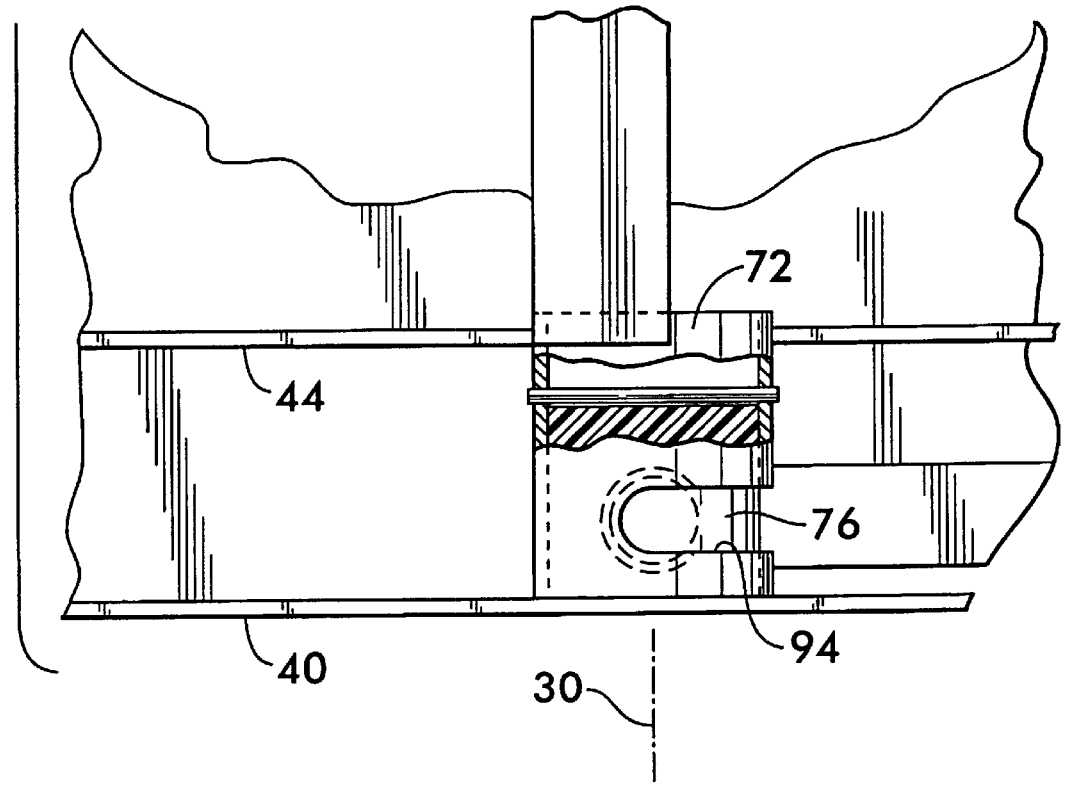
FIG.5

CHAFER

BACKGROUND OF THE INVENTION

This invention relates to food serving devices, in general, and, more particularly, to a chafers or chafing dishes for holding foods and having a pivotable cover which can be readily pivoted into a multiplicity of positions and which remains stable in the position selected.

Chafing dishes or chafers of the prior art are provided for holding and heating a food to be served from a serving pan. The heating is accomplished by means of at least one portable burner, typically located below the dish or pan holding the food. The portable burner permits the chafing dish to be placed in the dining room to serve food directly from the pan while it is continuously being heated. The food service pan is typically supported by a support frame. In some applications the support frame may include a water pan for receipt of the food service pan to prevent the food from being burned. In other applications no water pan may be used.

Most chafers also include a cover or lid which is arranged to be disposed over the food service pan to keep the food hot and to prevent it from drying out or otherwise degrading. The cover or lid may be mounted so that it can be totally removed from the chafer to provide access to the food service pan to enable the food to be taken from the pan. Alternatively, the cover may be pivotably mounted to the support structure of the chafer so that it can be pivoted open to provide access to the food in the food service pan. Pivotably mounted covers are typically arranged so that they can be lifted up by a handle on the front of the cover to pivot the cover backward to expose the food service pan. The center of gravity of the cover is usually located so that when the cover is lifted beyond a certain point, e.g., the "balance point," the weight of the cover automatically pulls the cover downward and under the food service pan so as to be out of the way of the pan to enable food to be served therefrom.

Some pivoting cover chafers commonly utilize some type of friction device, e.g., disks with springs, or mechanical stops to prevent the cover from rotating into a "free fall" state once the center of gravity of the cover passes the balance point. Moreover, some prior art chafers include a plunger type stop to allow the cover to hold at a 90 degree partially open position. In such an arrangement the plunger must be pulled to release the cover in order to rotate it to its fully open position. The fully open position is typically less than 180 degrees, e.g., is approximately 160 degrees. This action requires one hand to hold the cover and the other hand to release the plunger. As will be appreciated, such action may be difficult to perform by the user since one hand of the user may be holding a plate to fill or a pan to replenish the food in the chafer.

The patent literature includes various patents directed to chafing dishes with pivotable covers. See for example, U.S. Pat. No. 5,788,196 (Forman) which discloses a support stand with a dome-shaped cover for containing and housing a pan for holding water and/or food above a burner assembly. The stand includes an upper support ring which has an inner and outer ring and a channel integrally formed therebetween for receiving and supporting the dome-shaped cover when the cover is opened or closed over the chafing dish. The support ring is formed from a single piece of metal and includes a C-shaped aperture approximately 50% around the diameter of the ring to permit the rim of the dome-shaped cover to pass freely therethrough and engage a stop which can be pivoted out of the way so that the cover can be partially or fully opened. Other U.S. Pat. Nos. are: 4,320,849 (Yellin), 5,597,500 (Hasenfratz et al.), D365,724 (Yu), D369,506 (Tinius), and D369,507 (Tinius).

While the above described prior art chafers may be generally suitable for their purposes, a need still exists for a chafer which can exhibit the following features: (1) the ability to serve food from either side of the chafer—accomplished by the chafer's cover being able to open to a fully open (e.g., 160 degree) position, (2) the ability to provide one handed operation—only a single hand of a customer or server is necessary to pivot the cover to any of its desired positions, (3) the ability to readily remove the cover for cleaning, (4) the ability of the cover to assume a multiplicity of stable positions, e.g., fully closed, partially open and fully open, (5) simplicity of construction and (6) an aesthetically pleasing appearance.

SUMMARY OF THE INVENTION

A chafer comprising a support frame, a food service pan, a cover, and a cover pivoting assembly. The cover has a peripheral edge. The support frame is arranged for releasably supporting the pan therein and for mounting the cover over the support frame to enable the cover to be pivoted about a horizontal axis from a fully closed position to an intermediate partially closed position and to a fully open position, and vice versa. The cover pivoting assembly is arranged to enable the cover to be automatically held stable in the fully closed, partially open or fully open positions by the mere movement of the cover to any of those positions.

In accordance with one exemplary preferred aspect of this invention the chafer includes a damper assembly coupled to the cover pivoting assembly for damping the movement of the cover into the partially open and fully open positions and for producing a frictional force to hold the cover in the selected position.

In accordance with another exemplary preferred aspect of this invention the chafer includes a cover mounting assembly for releasably mounting the cover onto the support frame and for preventing it from being removed when it is in any position other than the fully closed position.

DESCRIPTION OF THE DRAWINGS

The details of the structure and operation of the chafer of this invention will become readily appreciated as the same becomes better understood by reference to the following detailed description, when considered in connection with the accompanying drawings, wherein:

FIG. 5 is an enlarged sectional view taken along lines 5—5 of FIG. 2;

DETAILED DESCRIPTION OF THE PREFERRED EMBODIMENT

Figure 1:
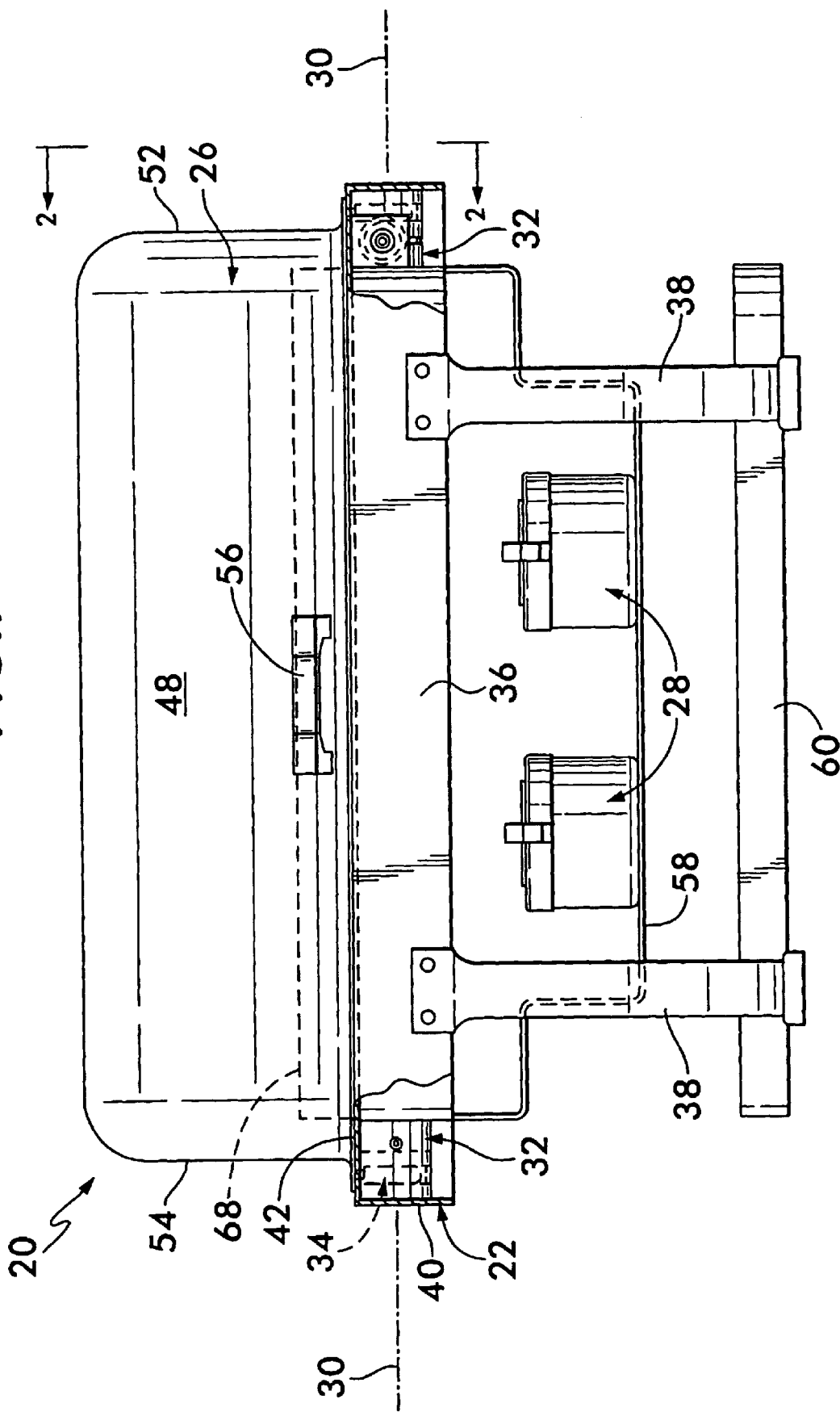
FIG. 1 is a front view of one exemplary embodiment of a chafer constructed in accordance with this invention, with its cover shown in its closed position with respect to the chafer's support frame.

Referring now in greater detail to the various figures of the drawing wherein like reference characters refer to like parts, one exemplary embodiment of a chafer constructed in accordance with the present invention is shown generally at 20 in FIG. 1. The chafer 20 basically comprises a support frame assembly 22, a chafing dish or "food service pan" 24 (shown by phantom lines in FIG. 7), a cover or lid 26 and a pair of heating elements, e.g., fuel canisters 28. The support frame 22 is arranged to hold the food service pan 24 at an elevated position above the heating elements 28 so that the heating elements 28 can heat any food in the pan. The cover 26 is pivotably mounted with respect to the support frame 22 so that the cover can be pivoted about a rotation or pivot axis 30 from a fully closed position, like that shown in FIGS. 1 and 2, to a partially open position, like that shown in FIG. 3, to a fully open position, like that shown in FIG. 4, and vice versa. The cover is pivotally mounted with respect to the support frame assembly 22 by a cover pivoting assembly 32 (FIGS. 1 and 8). The cover 26 itself is releasably secured to the cover pivoting assembly 32 by a cover mounting assembly 34 (FIGS. 1 and 8). The details of the cover pivoting assembly 32 and the cover mounting assembly 34 will be described later. First, the details of the support frame 22, the chafing dish 24, the cover 26, and the heating elements 28 will be discussed.

As can be seen, the support frame assembly 22 basically comprises a ring-like member 36 from which plural, e.g., four, legs 38 depend downward. The ring-like member 36 includes an outer ring or wall 40, a top wall portion 42, and an inner ring or wall 44. The ring-like member 36 can be of any geometric shape. In the embodiment shown, it is of rectangular shape.

Figure 2:
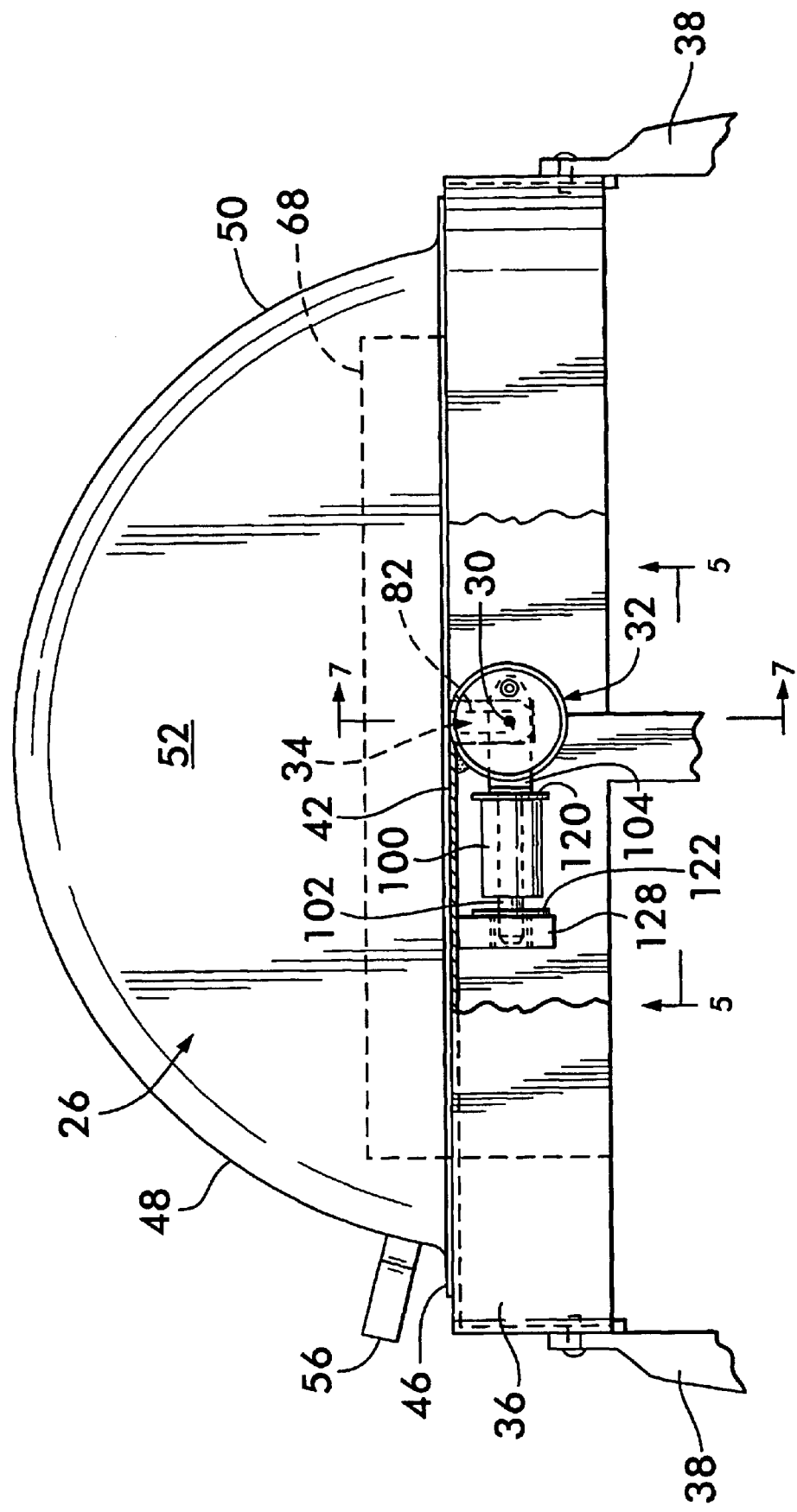
FIG. 2 is an enlarged partial end view taken along lines 2—2 of FIG. 1.

The top wall portion 42 of the ring-like member 36 only extends for the front half of the ring-like member, i.e., it fills the space between the outer and inner rings 40 and 44, respectively, along the front of the chafer's support frame 22 (the portion shown in FIG. 1) and along each side up to a point immediately in front of the location of the pivot axis 30 as shown in FIG. 2. The rest of the ring-like member 36 is open between rings 40 and 44 in a similar manner to the teachings of U.S. Pat. No. 5,788,196 (Forman) to accommodate the cover when it is opened.

The cover 26 basically comprises a hollow member having a lower flanged lip 46 extending in a common plane and from which a front wall 48, rear wall 50 and pair of sidewalls 52 and 54 project upwardly. The front wall 48 and rear wall 50 are each arcuate (e.g., a circular arc of approximately 90 degrees) and merge together at the crown of the cover. The sidewalls 52 and 54 are each planar and of generally semi-circular shape.

Figure 3:
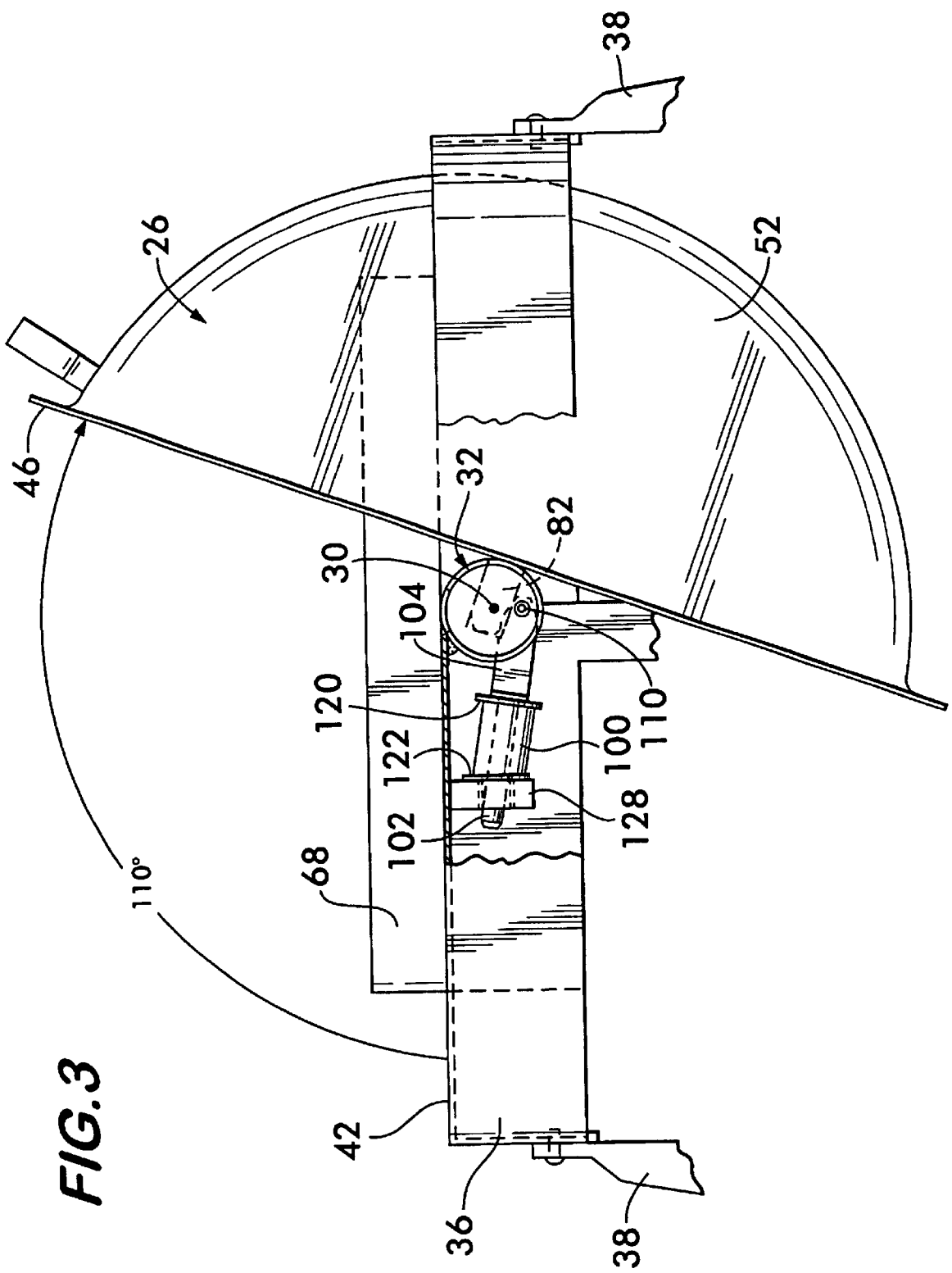
FIG. 3 is a partial end view, like that of FIG. 2, but showing the cover of the chafer in its partially open position.

As noted earlier, the cover 26 is mounted on the frame assembly 22 so that it can be pivoted from a fully closed position to an intermediate, partially open position and to a fully open position, and vice versa. The cover can be held in any of those positions without the use of any user actuable holding means, as has characterized the prior art. In order to enable a user to pivot the cover to any of its desired positions, the cover includes a handle 56 located on the front wall 48 adjacent the flanged lip 46. When the cover is mounted on the support frame assembly 22 and is in the closed position, the lip 46 of the cover is disposed horizontally, that is, parallel to the top surface ring-like support member 36. In the partially open position as shown in FIG. 3, the lip 46 of the cover is disposed at an obtuse angle, e.g., approximately 110 degrees, to the plane of the top wall portion 42 of the ring-like support member 36. When the cover is in the fully open position, the cover's lip 46 is disposed at an even greater obtuse angle, e.g., approximately 160 degrees, to the plane of the top wall portion 42 of the support frame.

It should be pointed out at this juncture that while the cover 24 and the support frame assembly's ring-like member 36 are shown as each being of rectangular profile, they may be of other shapes. For example, the support frame may be of square shape, circular shape, or oval shape. In such alternative embodiments the cover will be of a corresponding shape.

Depending downward from the ring-like member 36 of the support frame assembly is a bracket strip 58 for supporting the heating members 28 thereon below the bottom of the food service pan 24. As mentioned earlier, each of the heating elements 28 are fuel canisters, i.e., cans containing an ignitable fuel and an associated wick. Each of the cans 28 is arranged to be ignited at its wick to produce a flame for heating the food service pan 24 disposed thereabove.

Figure 4:
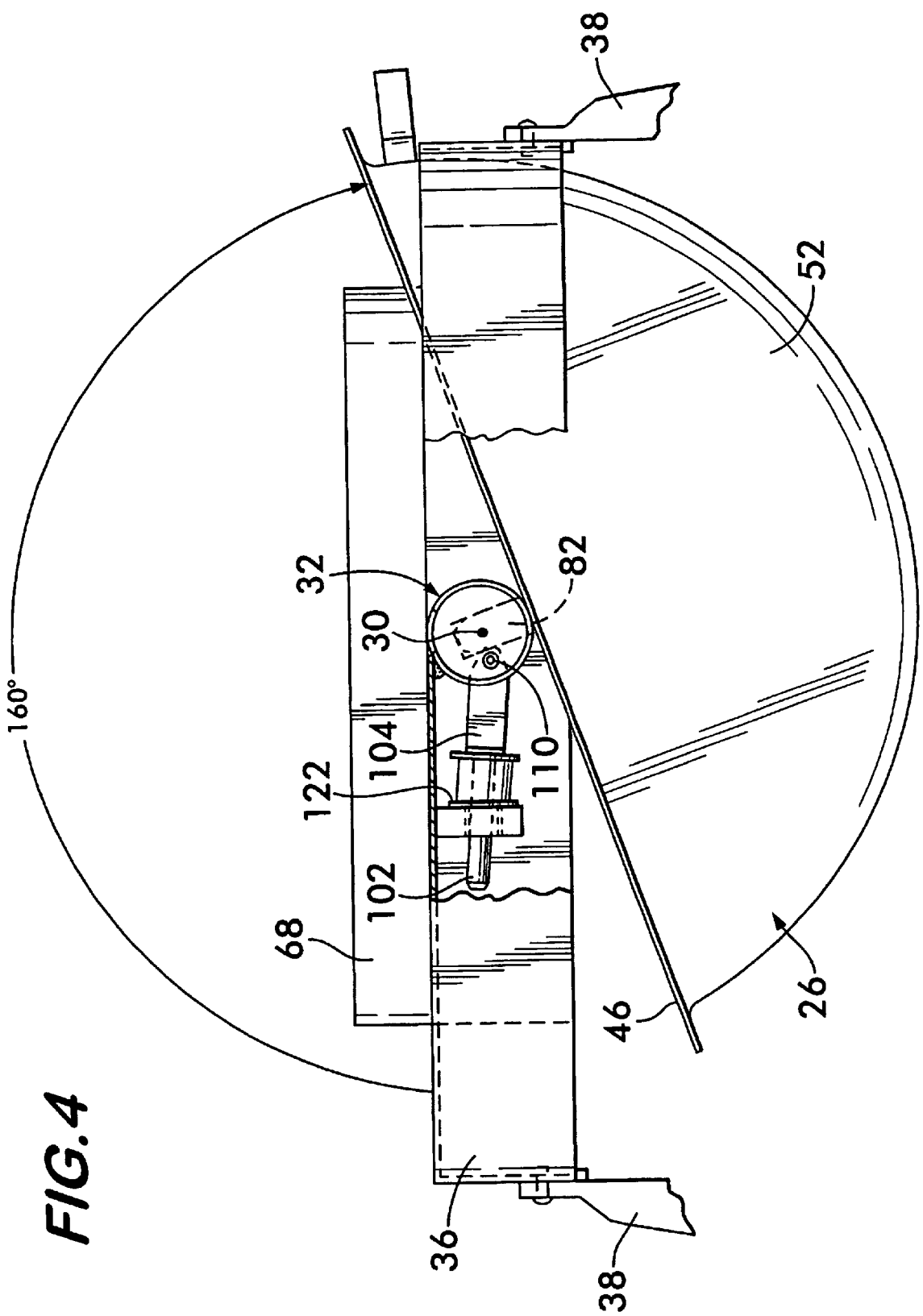
FIG. 4 is a partial end view, like that of FIGS. 2 and 3, but showing the cover of the chafer in its fully open position.

In order to reinforce the support frame assembly's legs, a ring 60 (FIG. 1) is provided secured to the lower end of each of the legs 38. As best seen in FIGS. 2–4, each of the legs 38 is mounted to the outer ring 40 of the ring-like member 36 via any conventional mounting technique, e.g., rivets. Screws or welded or braised joints can be used in lieu of rivets.

Figure 7:
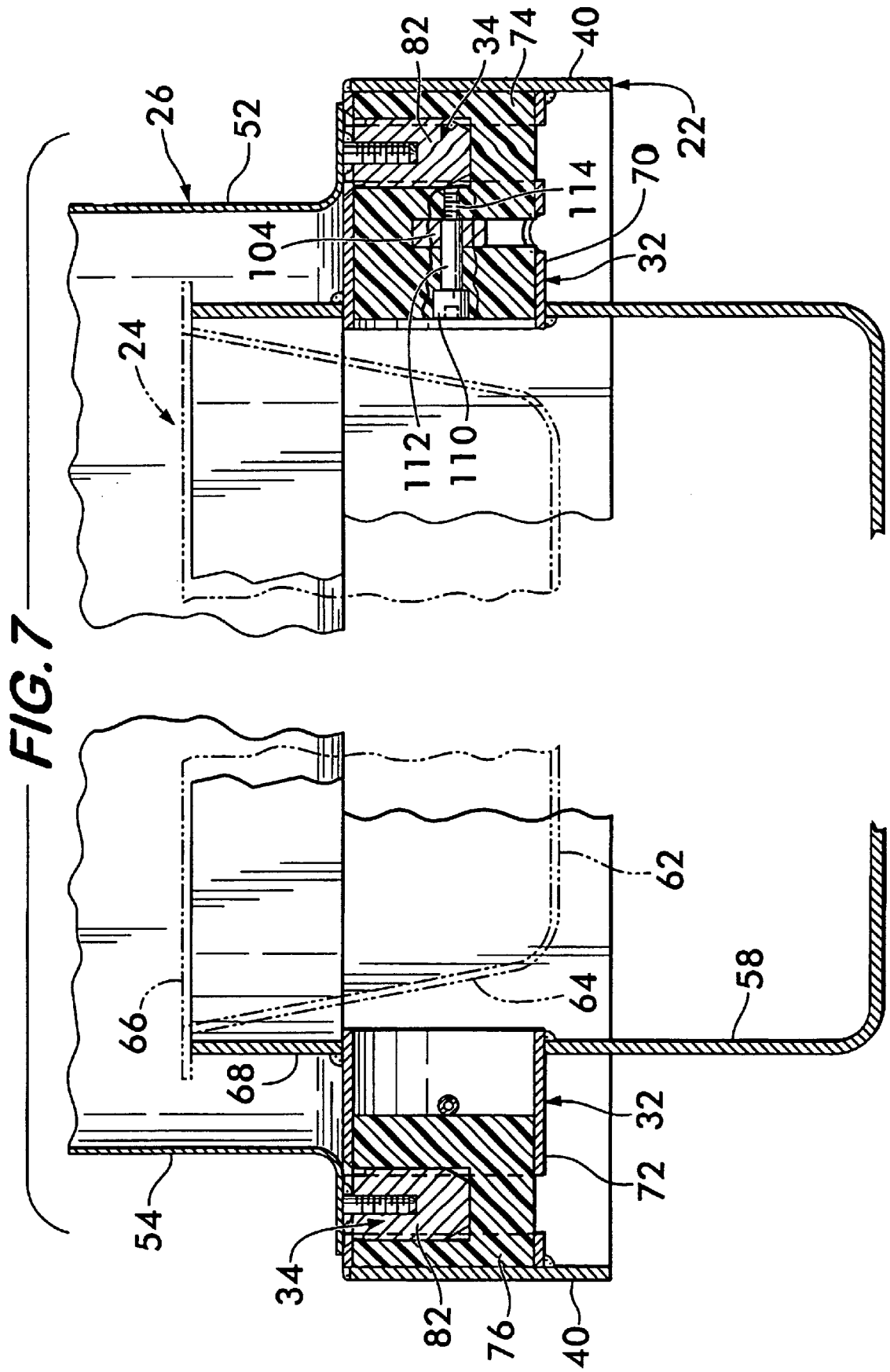
FIG. 7 is an enlarged sectional view taken along lines 7—7 of FIG. 2.
Figure 8:
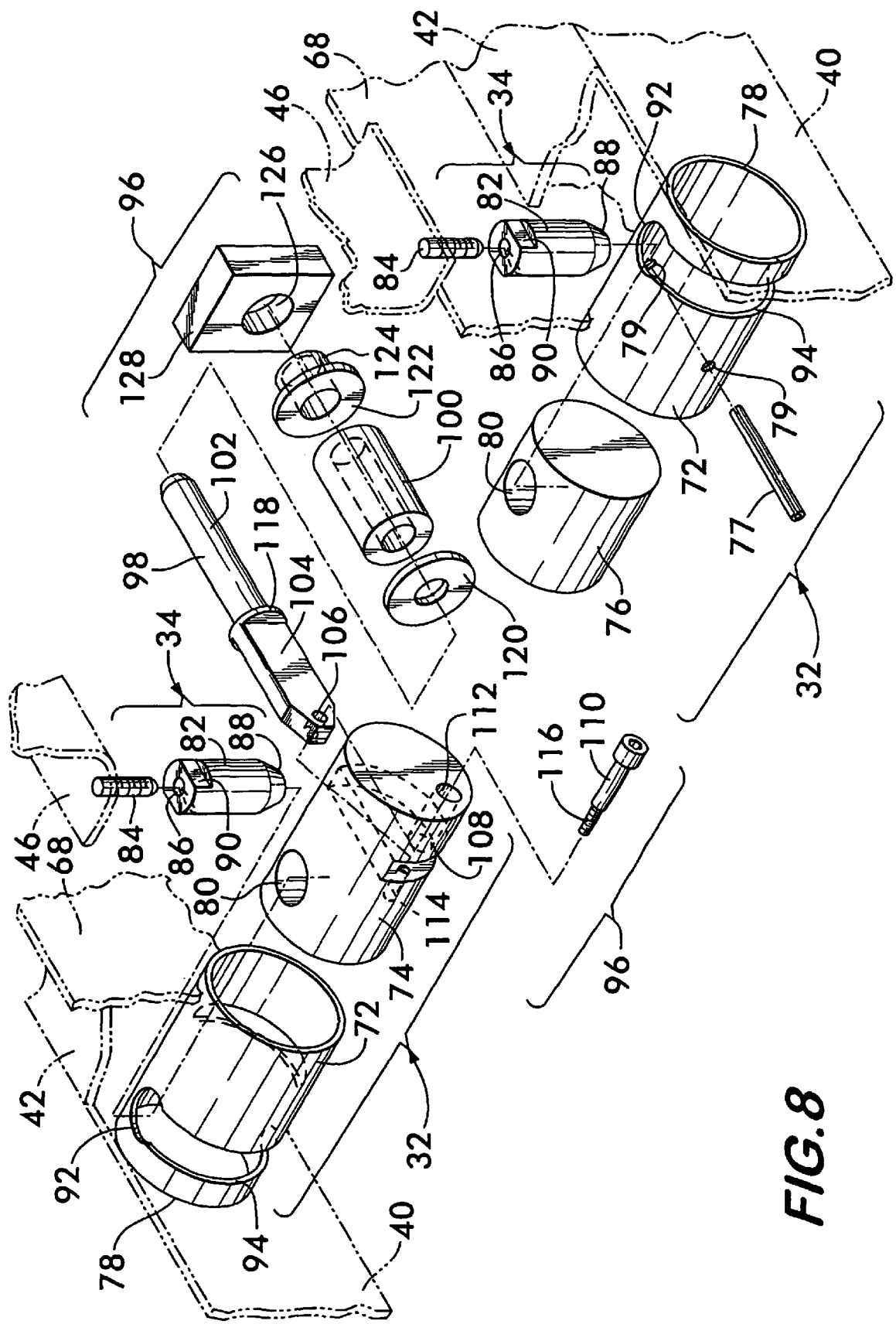
FIG. 8 is an exploded isometric view of portions of the pivot assemblies for pivotably supporting the cover of the chafer.

As mentioned earlier, the food service pan 24 is shown by phantom lines in FIG. 7. It basically comprises a bottom wall 62 from which a peripheral sidewall 64 projects upward. The sidewall 64 terminates in a flanged upper lip or rim 66. If the pan 24 is of rectangular shape, the peripheral sidewall is made up of four generally planar walls (each of a rectangular shape), whereas if the pan 24 is circular or oval, the sidewall is a continuous circular or oval shaped sidewall. The pan 24 is arranged to be supported by a ring 68 forming a part of the support frame assembly 22. To that end, the pan 24 is inserted into the interior of the ring 68 when the cover 24 is in the fully open position (FIG. 4), whereupon the undersurface of the rim 66 of the pan engages the top surface of the ring 68 to hold the pan in place over the heating elements. Depending upon the size of the pan, the peripheral sidewall of the pan may engage the ring 68 instead of the rim 66 engaging the ring 68.

Referring now to FIGS. 7 and 8, the details of the cover pivoting assembly 32 will now be described. As can be seen, the cover pivoting assembly 32 basically comprises a pair of trunnion sleeves 70 and 72 and a pair of trunnions 74 and 76. Both trunnion sleeves are formed of any suitable material, e.g., stainless steel. The trunnion sleeve 70 is a tubular member having an end 78 which is fixedly secured, e.g., welded, to the inner surface of the outer ring 40 of the ring-like member 36 and with the longitudinal central axis of the trunnion sleeve being coaxial with the pivot axis 30 of the cover 24. The other trunnion sleeve 76 is mounted in a similar manner to the inner surface of the outer ring opposite to the trunnion sleeve 70 and coaxial therewith. Thus, the central axes of the two trunnion sleeves 70 and 72 are coaxial and form the pivot axis for the cover. Disposed within the trunnion sleeve 70 is the trunnion 74. The trunnion 74 basically comprises a solid cylindrical body whose length is approximately that of the trunnion sleeve. The trunnion 74 can be made of any suitable material, e.g., Nylon, to enable it to rotate within the trunnion sleeve, yet to frictionally engage the inner surface of the trunnion sleeve when desired (as will be described later).

The two trunnions 70 and 76 are arranged to be releasably secured to the lid or cover 24 so that when the cover is secured thereto they serve as the pivots about which the cover can be swung or pivoted to move the cover into any orientation desired by the user. To that end, the trunnion 74 includes a hole or bore 80 extending radially therein. The bore 80 is located adjacent the outer end of the trunnion, that is, the portion of the trunnion located closest to the point 78 at which the trunnion sleeve is welded to the outer ring 40. The trunnion 74 is of slightly smaller outside diameter than the inside diameter of the trunnion sleeve 70 and is adapted to rotate about its longitudinal central axis within the trunnion sleeve 70. The trunnion 76 is similar to the trunnion 70. Thus, it also includes a radially extending bore 80 located closest to its inner end, that is, the end closest to the point 78 at which the trunnion sleeve 72 is welded to the inner surface of the outer support ring 40. The trunnion 76 is held within the trunnion sleeve 72 to prevent accidental displacement by means of a roll pin 77 extending through diametrically opposed holes 79 in the trunnion sleeve (see FIGS. 5 and 8).

The cover mounting assembly 34 is provided to enable the cover to be releasably secured to the two trunnions. As best seen in FIG. 8, the cover mounting assembly basically comprises a pair of posts 82 which are arranged to be received within respective bores 80 of the trunnions 74 and 76, respectively. To that end, a threaded stud 84 is welded to the undersurface of the lip 46 of the cover 24 at the center of the sidewall 52. A similar stud 84 is welded to the undersurface of the lip 46 at the center of sidewall 54. Each post 82 includes a threaded bore 86 into which the stud 84 is threadedly received to fixedly secure the post onto the cover's lip.

Each post is of a cylindrical shape having a tapered free end 88. The opposite end of each post includes a necked-down portion 90 to form a pair of shoulders. The spacing between the walls forming the shoulders 90 is selected to cooperate with a keyhole slot (to be described later) of a corresponding width and which is located in the associated trunnion sleeve to prevent the post from exiting the bore in the trunnion when the cover is at any rotational or pivotal position other than the fully closed position. In order to enable each post 82 to be extended into the bore 80 in its associated trunnion, each trunnion sleeve includes a circular opening 92 whose inner diameter is the same or slightly larger than the diameter of the bore 80 in the trunnion. The circular opening 92 is located in the sidewall of the trunnion sleeve spaced from the end wall thereof by the same spacing that the bore 80 in the trunnion is spaced from the outer end of the trunnion. Accordingly, when the trunnion 74 is located within the trunnion sleeve 70 the bore 80 in the trunnion can be aligned with the hole 92 in the trunnion sleeve. When the hole 92 and the bore 80 are aligned, the post 82 that is located adjacent the cover's sidewall 52 can be extended therethrough to couple the lid to the trunnion 74 at that side of the cover. The other trunnion sleeve 72 is constructed in a similar manner to receive the other post 82, i.e., the post attached to the cover's lip adjacent the sidewall 54.

As mentioned earlier, the cover mounting assembly 34 is arranged to prevent the cover 24 from being removed from the support frame when it is in any position other than its fully closed position. To that end, the cover mounting assembly 34 also includes the heretofore mentioned two keyhole slots. The slots are designated by reference number 94. The slots 94 are located in the respective trunnion sleeves 70 and 72. In particular, one slot 94 is disposed contiguous with the opening 92 in the trunnion sleeve 70 and extends around the periphery of that sleeve for approximately 180 degrees. The width of the slot 94 is selected to be just slightly larger than the width of the post 82 between the two shoulders 90. The slot 94 in the other trunnion sleeve is contiguous with the opening 92 in that sleeve and also extends approximately 180 degrees about the periphery of that sleeve. Accordingly, when each post 82 is extended through the associated aligned opening 94 and bore 80 when the cover is in its closed position, the cover can be mounted on or taken off the chafer 20. When the cover is rotated about the pivot axis 30 to any angular orientation wherein the portion of the post between the shoulders 90 enters into the associated keyhole slot 94 and slides along that slot to the position corresponding to the amount that the lid or cover is open, the cover is prevented from being removed. In particular, as will be appreciated by those skilled in the art, the portions of the trunnion sleeve contiguous with the slot will bear against the post's shoulder walls to prevent the post from exiting out of the slot at any position other than the position in which the post is located at the hole 92. It is at that position that the lid is in its fully closed position. Thus, at any other position along the slot 94, the cover will be in some open position and the post will be prevented from exiting out of the slot.

As best seen in FIG. 2, the location of the center of gravity (C.G.) of the cover 24 is selected so that it is slightly forward and above the pivot axis 30 of the cover. By so doing, the cover will automatically close whenever its flange or rim 46 is pivoted upward less than the angle at which the center of gravity (C.G.) is disposed over the pivot axis 30. Once the center of gravity passes above and to the rear of the pivot axis 30, the cover will automatically move to the next position, e.g., the partially open position, due to the force of gravity.

In order to dampen the movement of the cover to the partially open or fully open position when the cover is lifted and the center of gravity moves beyond the pivot axis, the chafer 20 includes a damper assembly 96. The damper assembly also serves to automatically induce frictional engagement between the trunnion 74 and its trunnion sleeve 70 whenever the cover is in any position between the partially open position of FIG. 3 and the fully open position of FIG. 4 to hold the cover stable in that position without the need for any user actuation.

The details of the damper assembly can best be seen in FIG. 8 and basically comprises an elongated actuator member 98, having one end a damper spring 100 and associated components (to be described later). The actuator member has one end in the form of a linear rod 102 of circular cross-section and the other end in the form of a flattened blade 104. The blade portion 104 includes a hole 106 at its forward end. The blade portion 104 is arranged to fit within a transverse slot 108 cut into the trunnion 74. The blade portion 104 is pivotally connected within the slot via a bolt 110 extending through a radially offset longitudinally extending smooth bore 112 at the end of the trunnion located opposite from the bore hole 80. A threaded bore 114 is located at the same radially offset position and is coaxial with the longitudinally extending smooth bore 112 to threadedly receive the threaded end 116 of the bolt 110. The blade portion 104 is extended into the slot 108 so that its hole 106 is axially aligned with the smooth bore 112 and the threaded bore 114. The bolt is then extended through the blade and those aligned bores so that the threaded end 116 of the bolt 110 is received in the threaded bore 114. The connection of the elongated actuator 98 to the trunnion 74 is thus offset from the center or rotational axis 30 of the trunnion. The portion of the elongated actuator member 98 at which the blade portion 104 merges with the rod portion 102 is in the form of a circular flange 118.

Figure 6:
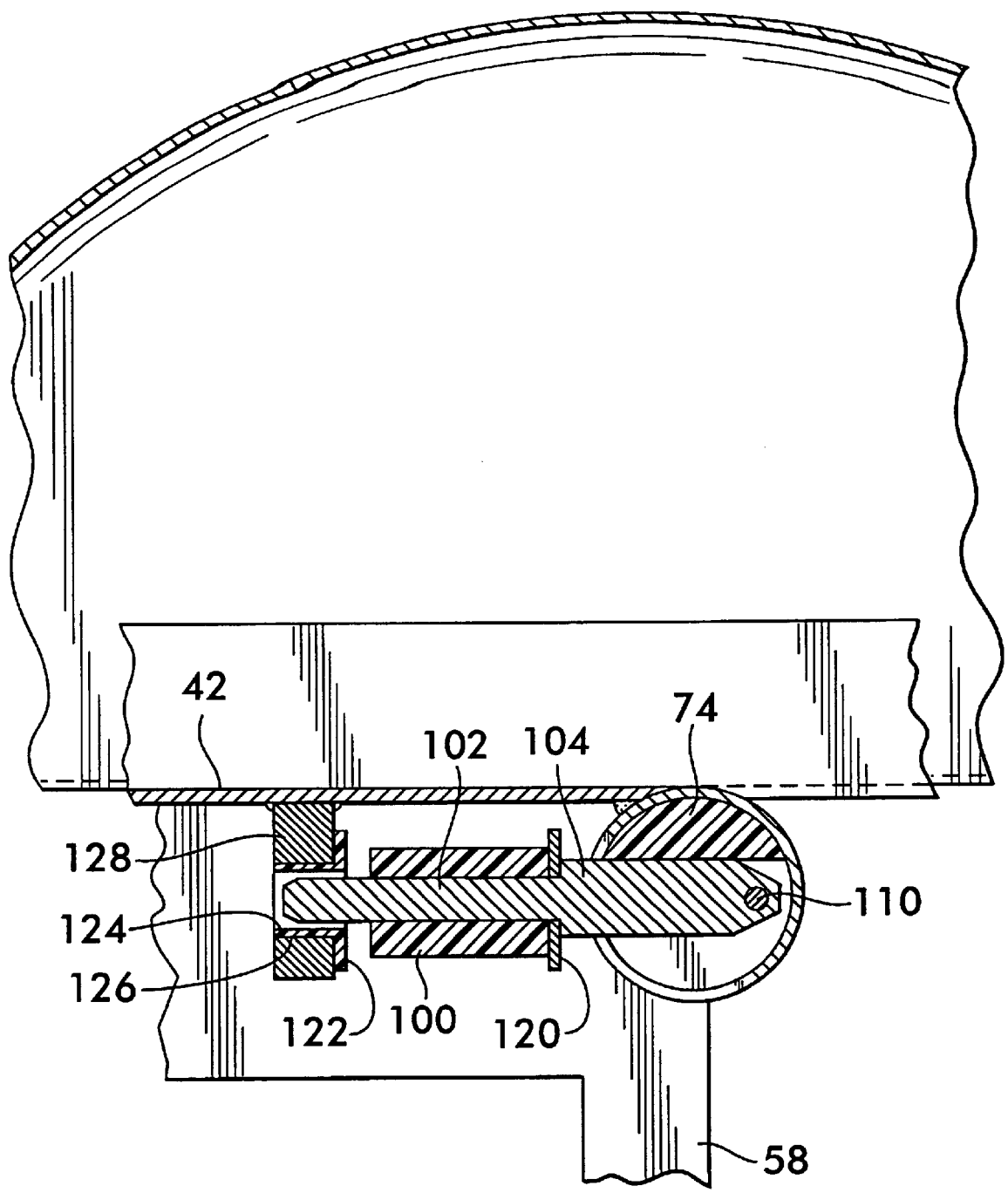
FIG. 6 is an enlarged sectional view taken along lines 6—6 of FIG. 5.

As mentioned earlier, the damping assembly 96 comprises additional components to the actuator member 98 and the damper spring 100. In particular, a flat washer 120 is disposed on the rod portion 102 up against the flange 118. The heretofore identified damper spring 100 is in the form of a compressible sleeve, e.g., a sleeve formed of a resilient material such as polyurethane. The sleeve includes a central passageway to receive the rod portion 102 of the elongated actuator member 98 so that the damper spring 100 can be extended on it to abut the washer 120. A shoulder washer 122 is disposed on the rod portion 102 of the elongated actuator member 98 at the opposite end of the damper sleeve 100 to interpose the damper sleeve between it and the washer 120. The shoulder washer 122 includes a cylindrical portion 124 surrounding the central opening of the washer. The free end of the rod portion 102 of the elongated actuator member 98 extends through the central opening of the shoulder washer 122 and is loosely fit therein (see FIGS. 3, 4 and 6) for reasons to be described later.

The cylindrical portion 124 of the shoulder washer 122 is arranged to be fixedly located within a hole 126 in a mounting block 128. The mounting block 128 is a rectangular member fixedly secured to the frame assembly. Since the inner diameter of the central opening in the shoulder washer 122 is larger than the outer diameter of the rod-like portion 102 of the elongated actuator member 98, that member can pivot or skew within the washer 122 with respect to the mounting block 128.

The movement of the cover 24 to each of its various stable positions will now be described with reference to FIGS. 2–4. In particular, when the cover 26 is in its fully closed state, the elongated actuator member 98 of damping assembly 96 is oriented such that its longitudinal axis is horizontal, with the free end of the rod portion 102 being approximately centered within the central opening in the shoulder washer 124. Since the elongated actuator member 96 is disposed generally horizontally, its point of pivotal attachment to the trunnion 74 is located approximately in line with the pivot axis 30 and behind it as shown in FIG. 2.

Lifting the cover 26 upward by its handle 56 to the point at which its center of gravity C.G. is located beyond the pivot axis 30, causes the cover to automatically move to the partially open position shown in FIG. 3. As mentioned earlier, in the embodiment shown the partially open position is at an obtuse angle of approximately 110 degrees. When the cover 26 is pivoted from its fully closed position to its partially open position, like shown in FIG. 3, the trunnions 72 and 74 rotate about the longitudinal pivot axis 30 within their respective trunnion sleeves. This action causes the pivot point at which the blade 102 is connected to the trunnion to rotate to the position shown in FIG. 3, whereupon that pivot point is below the pivot axis 30 of the cover. Thus, the elongated actuator member 98 is pivoted downward, i.e., the free end of the rod portion 102 being loosely fit within the shoulder washer 124 enables the elongated actuator member to tilt downward. This action causes the damping sleeve or spring 100 to be slightly compressed between the washers 120 and 122. As should be appreciated by those skilled in the art, the compression of the damping sleeve or spring 100 commences prior to the cover 26 reaching the partially open position of FIG. 3. When the force provided by the spring 100 resisting compression is equal to the gravitational force acting on the center of gravity of the cover that is now located behind and below the cover's pivot axis 30, the cover comes to rest at the partially open position shown in FIG. 3.

As will also be appreciated, with the lid in the partially open position, as shown in FIG. 3, the front portion of the food service tray 24 is totally exposed to enable either servers or patrons of the establishment using the chafer 20 to remove food from the tray from the front of the chafer. All the while this occurs, the lid remains in the stable, partially open position. If it is desired to provide total access to the chafing dish, i.e., access from either the front or rear of the chafer, the handle 56 of the cover 26 can be moved past the partially open position of FIG. 3 and towards the fully open position of FIG. 4. The pivoting of the cover about the pivot axis 30 causes the center of gravity C.G. to move further rearward. This continued rotation or pivoting of the cover about its pivot axis causes the damping assembly's elongated actuator member 98 to assume the position like that shown in FIG. 4, whereupon that member is disposed almost horizontally. In particular, in that configuration the bolt 110 connecting the blade portion 102 to the trunnion 74 will now be located approximately slightly below and to the front of the pivot axis 30. The damping sleeve 100, being compressible, will be compressed further, as shown in FIG. 4, until the amount of resistance it provides is equal to the gravitational force acting on the cover. In the embodiment shown, the cover will then assume the fully open position, i.e., the 160 degree position, shown in FIG. 4. In this position, the handle of the cover will be located immediately adjacent the top wall 42 of the support frame's ring-like member 36, with the lip 46 of the cover disposed behind the food service tray. Thus, the food service tray 24 will be fully exposed for removal of its contents from either the front or the rear of the chafer. In fact, access can also be had to the chafing dish from either side of the chafer.

Figure 9:
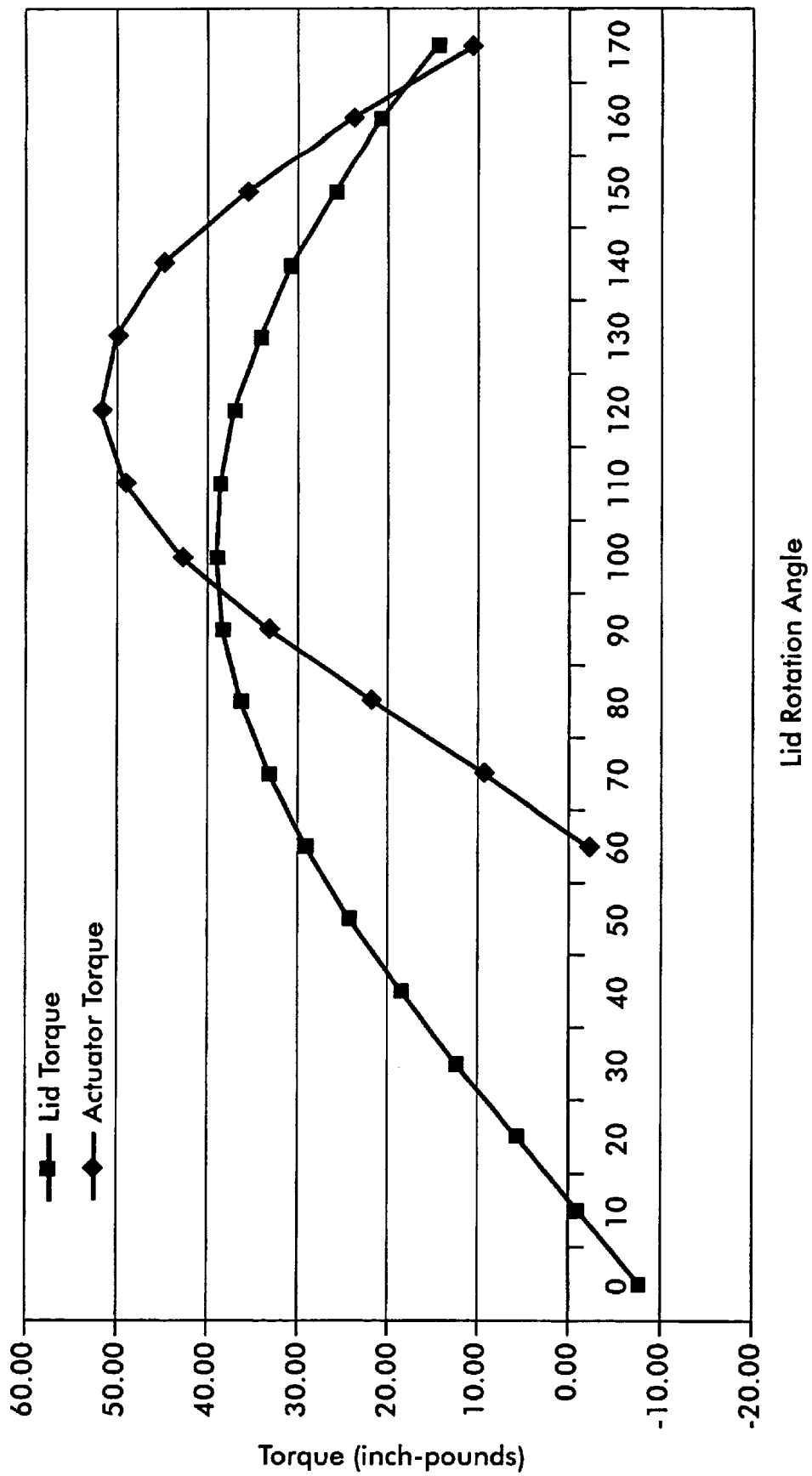
FIG. 9 is a graph showing the changes in the torque of the cover and the cover pivoting assembly (referred to as the "actuator" assembly) as a function of angular position of the cover with respect to the support frame.

The operation of the pivot assembly 32 and the damper assembly 96 to effect the frictional holding of the cover in any of its various partially or fully open positions will now be described with reference to FIGS. 1–4 and 9. In FIG. 9 the torque on the cover or lid is plotted as a function of the "lid rotation angle," i.e., the angle of the plane of the rim 46 of the cover 24 to the plane of the support ring top wall 42. The torque on the cover is the torque which naturally exists by virtue of the gravitational force acting on the cover at its center of gravity C.G. FIG. 9 also plots the torque provided by the damper assembly 96 (called the "actuator torque") on the cover as a function of the lid (cover) rotation angle. As can be seen in FIG. 9, when the cover is in the fully closed position, like that shown in FIGS. 1 and 2, the torque on the cover is a negative value indicating that the force of gravity acting on the cover's center of gravity is keeping the cover closed (i.e., the center of gravity is located in front of the pivot axis 30 of the cover). When the cover is closed, the resilient sleeve or spring 100 of the damper assembly 96 is in its uncompressed state and will not be applying any counter torque to the cover.

As the cover is raised by lifting on its handle 56, the torque on the cover 24 goes positive when the cover has been pivoted to the small angle, whereupon the center of gravity of the cover is located directly over the pivot axis 30. In the exemplary embodiment shown this small angle is approximately 13 degrees. Continued lifting of the cover past this point brings the cover's center of gravity rearward with respect to the pivot axis 30, whereupon the force of gravity acting on the cover will tend to pivot it further open. When the cover has pivoted to the point at which the damper sleeve (spring) 100 begins to be compressed by the pivoting action of the elongated actuator member 98 some resistance to further opening is encountered. In the exemplary embodiment at approximately 110 degrees the resistance torque provided by the spring member 100 is sufficient to resist further opening of the cover. If it is desired to open the cover more than the 110 degree partially opened state, moving the cover's handle further towards the rear of the chafer will cause the cover to move toward the fully open, 160 degree position against to opposing torque provided by the damper spring 100.

It should be pointed out at this juncture that the cover can be held stable at any angular orientation between its partially open, e.g., 110 degree, position and its fully open, e.g., 160 degree, position by the frictional force created on portions of the cover pivoting assembly 32 by the damper spring 100. In particular, once the cover reaches the 110 degree partially open position, the compressed spring 100 will apply a force on the elongated actuator member 98 tending to push that member toward the trunnion sleeve 70. Since the trunnion 74 located within that trunnion sleeve is connected to the elongated actuator member 98 by the bolt 106, the trunnion 74 will be carried slightly laterally within the trunnion sleeve so that a portion of its outer surface will frictionally engage the contiguous inner surface of the trunnion sleeve. This frictional engagement will tend to hold the cover in position, thereby rendering the cover stable at that angular orientation.

As should be appreciated from the foregoing, the chafer of the subject device enables the chafer cover to be stable in at least three preset positions, that is, the zero or fully closed position, the 100 degree or partially open position and the 160 degree or fully open position without the need to release or move any mechanical devices. In fact, as discussed above, the cover can be held in a multitude of partially open positions between the partially open position of FIG. 3 and the fully open position of FIG. 4.

The manner by which the cover is mounted to the support frame enables one to utilize a cover whose interior can be completely smooth, free of any cracks, crevices or hardware that may tend to trap food or bacteria.

The cover is removable from the chafer providing the cover is in the closed position. Thus, if the cover is in any position other than the closed position it will remain secured to the trunnion tubes and respective trunnions located therein.

Since the cover is stable in any of its positions, the chance of the cover accidentally bumping or dislodging either fuel holder is eliminated. Moreover, the fuel holder is preferably made an integral part of the support bracket so that it cannot be dislodged.

The cover and the associated components for mounting it for pivotable action with respect to a food service pan 24 can be incorporated into a tabletop or other built-in structure. Thus, in such an arrangement the chafer need not have legs, etc. It is anticipated that the built-in units will utilize electric heat as the source for keeping the food warm as opposed to fuel canisters producing flames like the exemplary embodiment 20. For tabletop applications, such as the chafer 20 shown and described above, the canned fuel heaters can be replaced with an electric heater, if desired.

Other advantages of the chafer of this invention are that the cover can be readily removed without the need for any special tools or techniques. Moreover, by virtue of the fact that the cover pivoting assembly is totally internal, side protrusions or trunnions, such as have characterized the prior art, are eliminated, thereby resulting in less space requirements for the chafer on the buffet or serving table. Moreover, the resulting chafer can have a more aesthetically pleasing appearance since nothing appears to protrude from the chafer and all of the moving parts are invisible when the cover is closed.

The chafer of this invention can be made from any materials generally used for food serving application, and not necessarily stainless steel. Moreover, the shape of the chafer is not limited to the rectangular shape and/or size shown. Thus, the chafer may be a two gallon oval, a three gallon round, a three gallon oblong, a one gallon round, a 1 gallon oblong, a three pint round, a three pint oblong, a six gallon round, or any other shape and/or size desired.

It should also be pointed out that a chafer constructed in accordance with this invention can be arranged so that it only has two positions for its cover, namely, fully closed and partially open (to provide access to the food service tray from the front of the chafer) or fully closed and fully open (to provide access to the food service tray from the front and rear of the chafer).

Without further elaboration, the foregoing will so fully illustrate my invention that others may, by applying current or future knowledge, readily adapt the same for use under various conditions of service.

I claim:

1. A chafer comprising a support frame, a food service pan, a cover, and a cover pivoting assembly, said cover having a peripheral edge, said support frame being arranged for releasably supporting said pan therein and for mounting said cover over said pan to enable said cover to be pivoted about a horizontal axis from a fully closed position through a continuous plurality of intermediate partially open positions to a fully open position, and vice versa, said cover pivoting assembly being arranged to enable said cover to be automatically held stable in said fully open position and in any one of said continuous plurality of partially open positions and in said fully closed position by the mere movement of said cover to any of said positions.

2. The chafer of claim 1 wherein said peripheral edge of said cover is oriented in a generally horizontal plane adjacent said pan when said cover is in said fully closed position, said peripheral edge of said cover being oriented in a plane at approximately an obtuse angle to horizontal when said cover is in said partially open position, and said peripheral edge of said cover being oriented in a plane at a larger obtuse angle to horizontal when said cover is in said fully open position.

3. The chafer of claim 2 wherein said cover has a center of gravity located so that said cover automatically returns to said fully closed position whenever said cover is oriented such that its peripheral edge is in a plane between said fully closed position and said partially open position.

4. The chafer of claim 3 wherein said cover is arranged to be automatically held in any orientation wherein the peripheral edge of said cover is located in a plane between said partially open position and said fully open position.

5. The chafer of claim 3 wherein said obtuse angle is approximately 100 degrees and wherein said larger obtuse angle is approximately 160 degrees.

6. The chafer of claim 1 wherein said cover is releasably mounted on said support frame.

7. The chafer of claim 6 comprising cover mounting means for preventing said cover from being removed from said support frame if said cover is in any position other than in said fully closed position.

8. The chafer of claim 7 wherein said cover pivoting assembly comprises at least one trunnion sleeve having a longitudinal axis and at least one trunnion arranged for disposition within said sleeve for rotation about said longitudinal axis, said cover being arranged to be pivoted about said axis to assume any of said fully closed, partially open and fully open positions, said cover mounting means being coupled to said cover pivoting assembly.

9. The chafer of claim 8 wherein said cover mounting means comprising a post fixedly secured to said cover, an opening in said trunnion sleeve and a contiguous slot in said trunnion sleeve, said opening being arranged for receipt of said post when said cover is in said fully closed position, said slot being arranged for receipt of said post when said cover is moved from said fully closed position toward said partially open or fully open position, said slot holding said post therein when said cover is in any position other than said fully closed position.

10. The chafer of claim 9 wherein said cover mounting means comprises a pair of posts fixedly secured to said cover at spaced apart locations and a pair of trunnion sleeves, each trunnion sleeve being arranged for receipt of a respective trunnion therein and having an opening for receipt of a respective one of said posts and a contiguous associated slot into which said respective one of said posts moves when said cover is moved from its fully closed position toward said partially open or fully open position.

11. The chafer of claim 9 wherein said slot is of a lesser width than the diameter of said opening, and wherein said post has an outside diameter just slightly less than the diameter of said opening, said post also including a shoulder portion having a width just slightly less than the width of said slot, said shoulder portion of said post being arranged to enter into said slot when said when said cover is moved to any position from said fully closed position.

12. The chafer of claim 1 wherein said cover pivoting assembly comprises at least one trunnion sleeve having a longitudinal axis and at least one trunnion arranged for disposition within said sleeve for rotation about said longitudinal axis, said cover being coupled to said trunnion and arranged to be pivoted about said axis to assume any of said fully closed, partially open and fully open positions.

13. The chafer of claim 12 wherein said cover pivoting assembly includes a post fixedly secured to said cover and an opening in said trunnion for receiving said post, said opening extending radially with respect to said longitudinal axis.

14. The chafer of claim 12 wherein said chafer comprises a damper assembly for said cover.

15. The chafer of claim 14 wherein said cover pivoting assembly includes a post fixedly secured to said cover and an opening in said trunnion for receiving said post, said opening extending radially with respect to said longitudinal axis, said damper assembly comprising an elongated member and a compressible member, said elongated member being pivotably coupled to said support frame and pivotably coupled to said trunnion, said elongated member being disposed in a neutral orientation when said cover is in said fully closed position and being arranged to be pivoted to a pivoted position when said cover is pivoted towards said partially open or fully open position, said compressible member being arranged to be compressed when said cover is pivoted from said full closed position into said partially open or fully open positions.

16. The chafer of claim 15 wherein said compressible member comprises a sleeve of a resilient material.

17. The chafer of claim 15 wherein said cover mounting means comprising a post fixedly secured to said cover, an opening in said trunnion sleeve and a contiguous slot in said trunnion sleeve, said opening being arranged for receipt of said post when said cover is in said fully closed position, said slot being arranged for receipt of said post when said cover is moved from said fully closed position toward said partially open or fully open position, said slot holding said post therein when said cover is in any position other than said fully closed position.

18. The chafer of claim 17 wherein said slot is of a lesser width than the diameter of said opening, and wherein said post has an outside diameter just slightly less than the diameter of said opening, said post also including a shoulder portion having a width just slightly less than the width of said slot, said shoulder portion of said post being arranged to enter into said slot when said when said cover is moved to any position from said fully closed position.

19. The chafer of claim 1 additionally comprising at least one heating member arranged to be disposed on said support frame below said pan.

20. The chafer of claim 1 wherein the support frame includes a support flange having plural legs depending downward therefrom.

21. The chafer of claim 12 wherein said cover includes a sidewall and said cover mounting assembly is confined within the bounds of said sidewall when said cover is in said fully closed position so that no portion of said cover mounting assembly can be seen from outside said chafer.

22. The chafer of claim 1 wherein said cover pivoting assembly enables said cover to be held stable in any position between said partially open position and said fully open position by the automatic application frictional engagement.

23. The chafer of claim 22 wherein said cover pivoting assembly comprises at least one trunnion sleeve having a longitudinal axis and at least one trunnion arranged for disposition within said sleeve for rotation about said longitudinal axis, said cover being coupled to said trunnion and arranged to be pivoted about said axis to assume any of said fully closed, partially open and fully open positions.

24. The chafer of claim 23 additionally comprising a member for applying a force to said trunnion to cause said trunnion to frictionally engage said trunnion sleeve.

* * * * *